(12) United States Patent
Roe

(10) Patent No.: US 8,793,922 B2
(45) Date of Patent: *Aug. 5, 2014

(54) MOBILE HUNTING DECOY

(76) Inventor: Garrett W. Roe, Hays, KS (US)

(*) Notice: Subject to any disclaimer, the term of this patent is extended or adjusted under 35 U.S.C. 154(b) by 244 days.

This patent is subject to a terminal disclaimer.

(21) Appl. No.: 13/350,784

(22) Filed: Jan. 15, 2012

(65) Prior Publication Data

US 2012/0180371 A1 Jul. 19, 2012

Related U.S. Application Data

(60) Provisional application No. 61/432,961, filed on Jan. 14, 2011.

(51) Int. Cl.
*A01M 31/06* (2006.01)

(52) U.S. Cl.
USPC .......................................................... 43/2; 43/3

(58) Field of Classification Search
USPC .......................................................... 43/2, 3
See application file for complete search history.

(56) References Cited

U.S. PATENT DOCUMENTS

| | | | | |
|---|---|---|---|---|
| 695,903 A * | 3/1902 | Braatz | ............................. | 472/84 |
| 833,966 A * | 10/1906 | Johnston | ............................. | 43/3 |
| 1,457,388 A * | 6/1923 | Newman | ............................. | 43/3 |
| 2,706,357 A * | 4/1955 | Nigh et al. | ............................. | 43/3 |
| 2,812,608 A * | 11/1957 | Jones | ............................. | 43/3 |
| 3,245,168 A * | 4/1966 | Pool | ............................. | 43/3 |
| 3,436,856 A * | 4/1969 | Miller | ............................. | 43/3 |
| 4,590,699 A * | 5/1986 | Nicks | ............................. | 43/2 |
| 4,651,458 A * | 3/1987 | Lanius | ............................. | 43/3 |
| 5,172,506 A * | 12/1992 | Tiley et al. | ............................. | 43/3 |
| 5,231,780 A * | 8/1993 | Gazalski | ............................. | 43/3 |
| 5,414,950 A * | 5/1995 | Johnson, Sr. | ............................. | 43/1 |
| 5,515,637 A * | 5/1996 | Johnson | ............................. | 43/2 |
| 5,595,012 A * | 1/1997 | Coleman | ............................. | 43/3 |
| 5,636,466 A * | 6/1997 | Davis | ............................. | 43/3 |
| 5,943,807 A * | 8/1999 | McPherson | ............................. | 43/2 |
| 5,983,552 A * | 11/1999 | Nelson | ............................. | 43/2 |
| 6,216,382 B1 * | 4/2001 | Lindaman | ............................. | 43/2 |
| 6,339,894 B1 * | 1/2002 | Solomon | ............................. | 43/3 |
| 6,349,902 B1 * | 2/2002 | Cripe | ............................. | 244/153 R |
| 6,374,530 B1 * | 4/2002 | Mierau | ............................. | 43/3 |
| 6,487,810 B1 * | 12/2002 | Loughman | ............................. | 43/2 |
| 6,519,891 B2 * | 2/2003 | Fulcher | ............................. | 43/2 |
| 6,675,522 B2 * | 1/2004 | Mathews | ............................. | 43/3 |
| 6,708,440 B2 * | 3/2004 | Summers et al. | ............................. | 43/2 |
| 6,775,943 B2 * | 8/2004 | Loughman | ............................. | 43/2 |
| 6,857,215 B1 * | 2/2005 | Rickrode | ............................. | 43/3 |
| 7,231,737 B2 * | 6/2007 | Bradford | ............................. | 43/2 |
| 7,562,487 B2 * | 7/2009 | Barr | ............................. | 43/2 |
| 7,784,213 B1 * | 8/2010 | Primos | ............................. | 43/2 |

(Continued)

*Primary Examiner* — Darren W Ark
*Assistant Examiner* — Morgan T Barlow
(74) *Attorney, Agent, or Firm* — Hovey Williams LLP

(57) ABSTRACT

A collapsible hunting decoy, useful for attracting small game is provided. The decoy comprises a collapsible support frame at least partially covered by a sleeve that includes the likeness of at least a portion of the desired game animal, such as, for example, the head and partial body of a turkey. The decoy can further include an attachable element depicting another portion of the animal, such as a turkey fan, that can be inserted into a receiving slot defined between portions of the collapsible frame. The decoy can be configured to include a variety of base or mounting elements, including a ground stake, a clamp, and a bow mount, which increases the flexibility of the decoy during use.

19 Claims, 10 Drawing Sheets

(56) References Cited

U.S. PATENT DOCUMENTS

| | | | |
|---|---|---|---|
| 8,087,199 B2* | 1/2012 | Roe | 43/2 |
| 8,191,304 B2* | 6/2012 | Poorman | 43/2 |
| 8,323,756 B2* | 12/2012 | Peterson | 428/16 |
| 8,506,339 B2* | 8/2013 | Fletcher | 441/1 |
| 2002/0017047 A1* | 2/2002 | Mierau | 43/3 |
| 2004/0250461 A1* | 12/2004 | Dryer | 43/2 |
| 2006/0143969 A1* | 7/2006 | Lindaman | 43/2 |
| 2007/0151139 A1* | 7/2007 | O'Dell | 43/2 |
| 2008/0216381 A1* | 9/2008 | Wyant | 43/2 |
| 2009/0107026 A1* | 4/2009 | Wyant | 43/2 |
| 2009/0249678 A1* | 10/2009 | Arnold | 43/2 |
| 2010/0064569 A1* | 3/2010 | Wyant | 43/2 |
| 2010/0115818 A1* | 5/2010 | Rogers | 43/2 |
| 2011/0010982 A1* | 1/2011 | Poorman | 43/2 |
| 2012/0042561 A1* | 2/2012 | Bain | 43/3 |
| 2013/0247441 A1* | 9/2013 | Bellamy et al. | 43/2 |

* cited by examiner

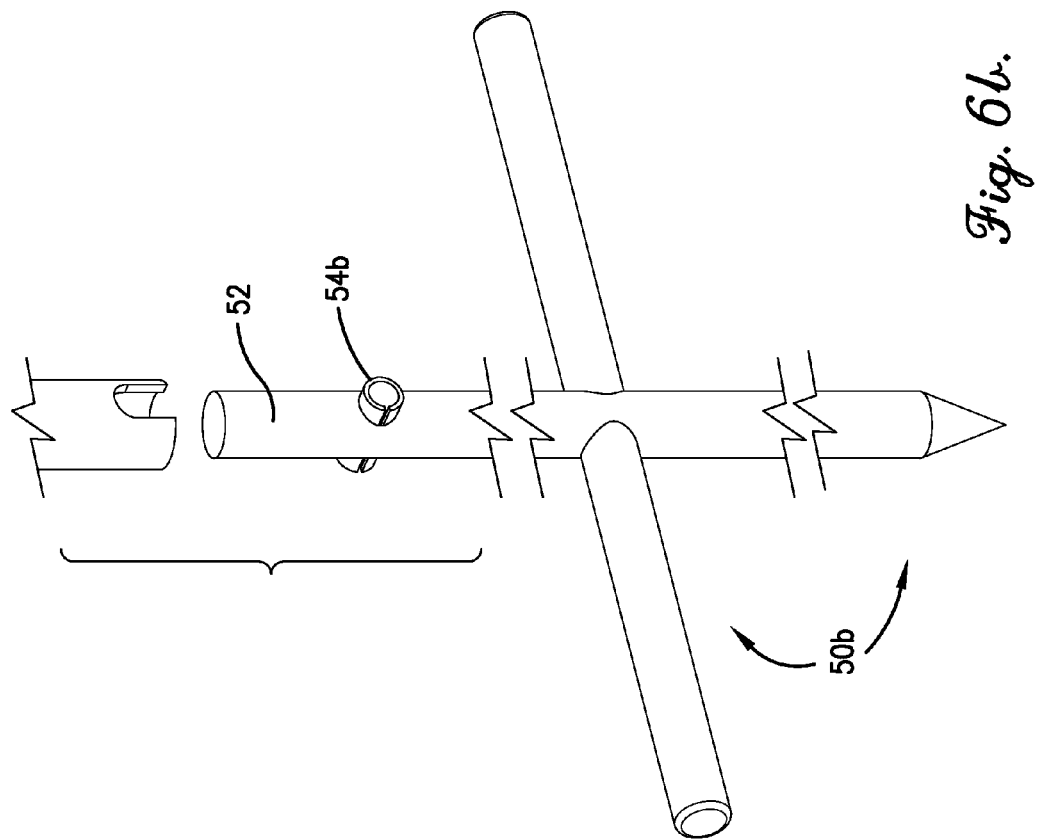
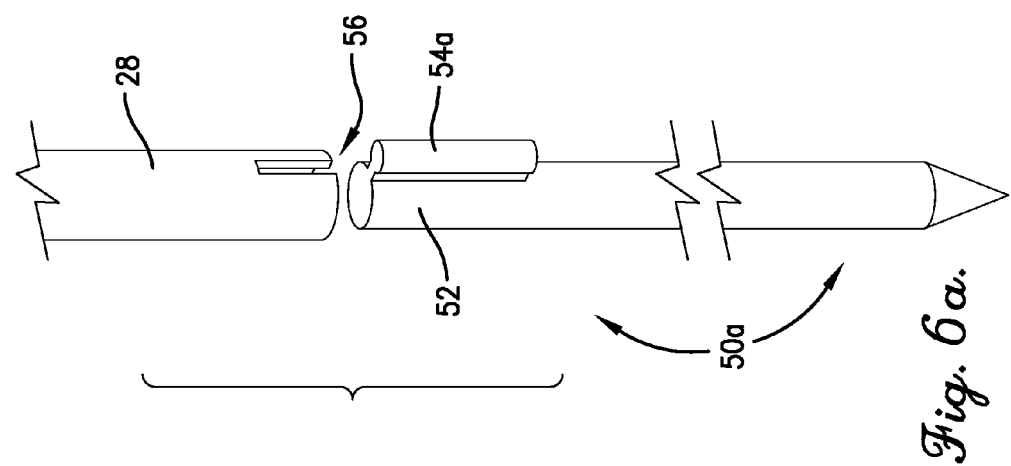

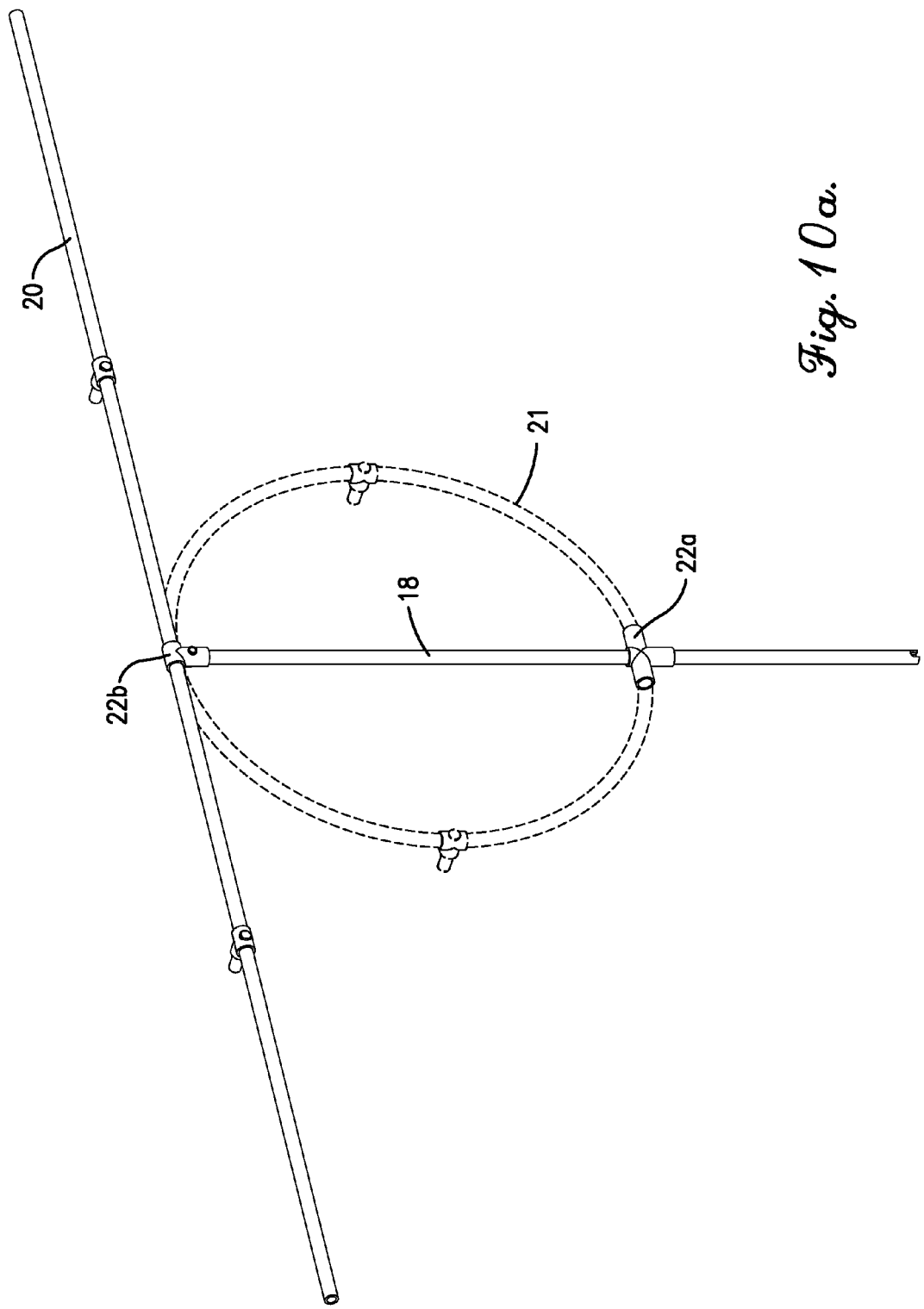

US 8,793,922 B2

MOBILE HUNTING DECOY

CROSS-REFERENCE TO RELATED APPLICATIONS

This application claims priority under 35 U.S.C. §119(e) from U.S. Provisional Patent Application No. 61/432,961, filed Jan. 14, 2011, the entirety of which is incorporated herein by reference.

BACKGROUND

1. Technical Field

One or more embodiments of the present invention generally relate to hunting. More particularly, embodiments of the present invention relate to collapsible hunting decoys that include a likeness of at least a portion of animal imprinted thereon.

2. Description of Related Art

Hunters often use decoys to attract an animal to within shooting range. When hunting small game, such as turkey, water fowl, and other birds, the ability of a hunter to move in a quick, yet undetected, manner is critical. However, some small game hunting decoys are bulky and awkward, which make transport difficult, thus limiting the applicability of such decoys in certain hunting scenarios. Other, more portable decoys are often not durable and can generally be unattractive to the desired game. Thus, a need exists for a portable, yet durable, decoy especially tailored to effectively attract small game animals, including birds. Preferably, the decoy would also be adaptable for use in a wide variety of hunting scenarios and environments.

SUMMARY

One embodiment of the present invention concerns a collapsible decoy assembly. The decoy assembly comprises an elongated vertical-support member, a plurality of fittings, an interior frame portion, and a sleeve. The vertical-support member has an upper end and a lower end and the plurality of fittings is coupled to the vertical-support member. The interior frame portion is coupled to at least one of the plurality of fittings to thereby faun. a continuous loop adjacent at least one of the upper and lower ends of the vertical-support member. The sleeve is sized and shaped to fit over the interior frame portion and has a likeness of a first portion of an animal imprinted thereon.

Another embodiment of the present invention concerns a collapsible decoy assembly. The decoy assembly comprises an elongated support member, a semi-rigid interior frame portion, a plurality of fittings, a sleeve, an exterior frame portion, and an attachable decoy element. The elongated support member has a first end and a second end and the plurality of fittings are operable to couple the interior frame portion to the elongated support member such that the interior frame portion forms a continuous loop adjacent at least one of the first and second ends of the elongated support member. The sleeve is sized and shaped to at least partially cover the interior frame portion and the sleeve comprises a two-dimensional likeness of a first portion of an animal imprinted thereon. The exterior frame portion is positioned outside of the sleeve and is coupled to the interior frame portion to thereby define a receiving slot therebetween. The attachable decoy element is sized and shaped to be inserted into and at least partially housed within the receiving slot and the attachable decoy element comprises a likeness of a second portion of the animal.

Yet another embodiment of the present invention concerns a method of assembling a collapsible decoy comprising: (a) coupling a semi-rigid interior frame support member having a first end and a second end to an elongated support member using at least one pair of fittings to thereby form an interior frame portion configured in a loop adjacent at least one end of the elongated support member; and (b) fitting a sleeve having a likeness of a first portion of an animal imprinted thereon over the interior frame portion.

BRIEF DESCRIPTION OF THE DRAWINGS

Various embodiments of the present invention are described in detail below with reference to the attached drawing Figure, wherein:

FIG. 6a is a fragmentary perspective view of a ground stake base element configured according to one embodiment of the present invention suitable for attachment to the collapsible structure of the decoy;

FIG. 6b is a fragmentary perspective view of another ground stake base element configured according to another embodiment of the present invention suitable for attachment to the collapsible structure of the decoy;

FIG. 10a is an perspective view of the collapsible support structure, particularly illustrating the coupling of the interior frame portion onto the elongated support member according to one embodiment of the present invention.

DETAILED DESCRIPTION

According to one or more embodiments of the present invention, a mobile hunting decoy for attracting animals, especially small game animals such as turkey, water fowl, or other birds, is provided. In some embodiments, the hunting decoys described herein can comprise collapsible decoys operable to be at least partially assembled and/or disassembled before, during, or after use. Various decoys and uses thereof according to embodiments of the present invention will now be described in detail, with reference to the Figures.

Figure 1:
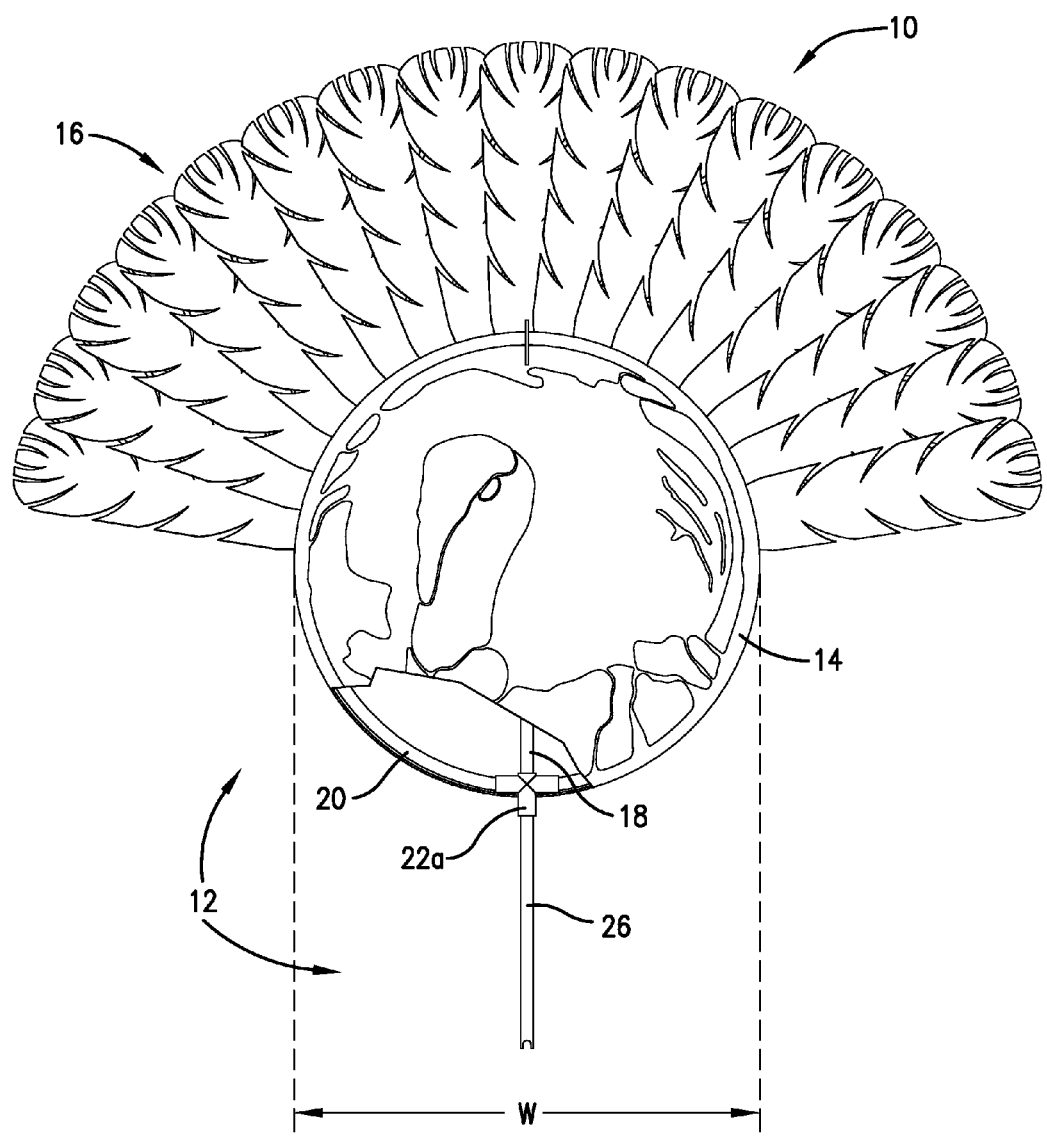
FIG. 1 is a front elevational view of a collapsible decoy configured according to one embodiment of the present invention.
Figure 2:
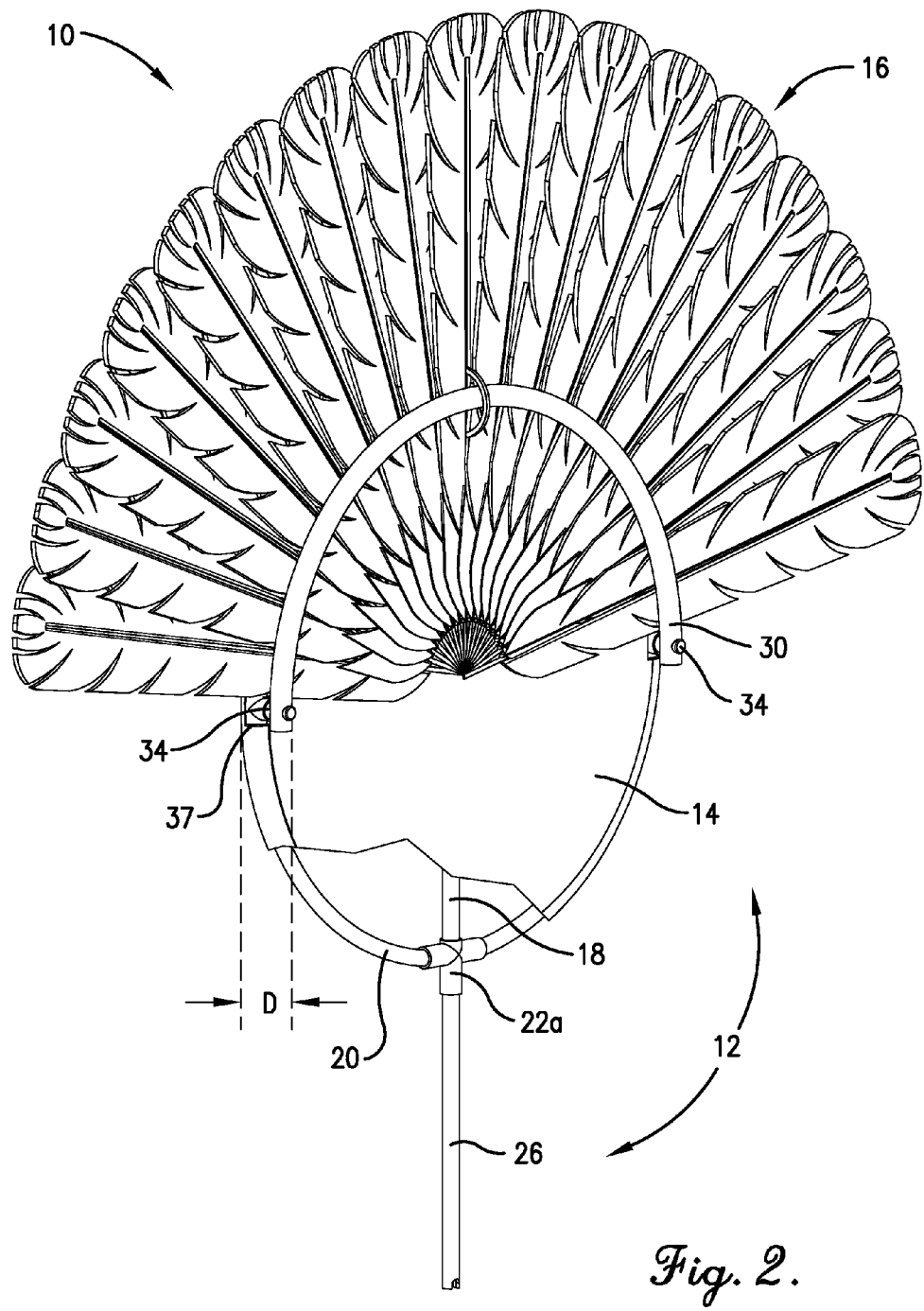
FIG. 2 is a rear perspective view of the collapsible decoy illustrated in FIG. 1.
Figure 3:
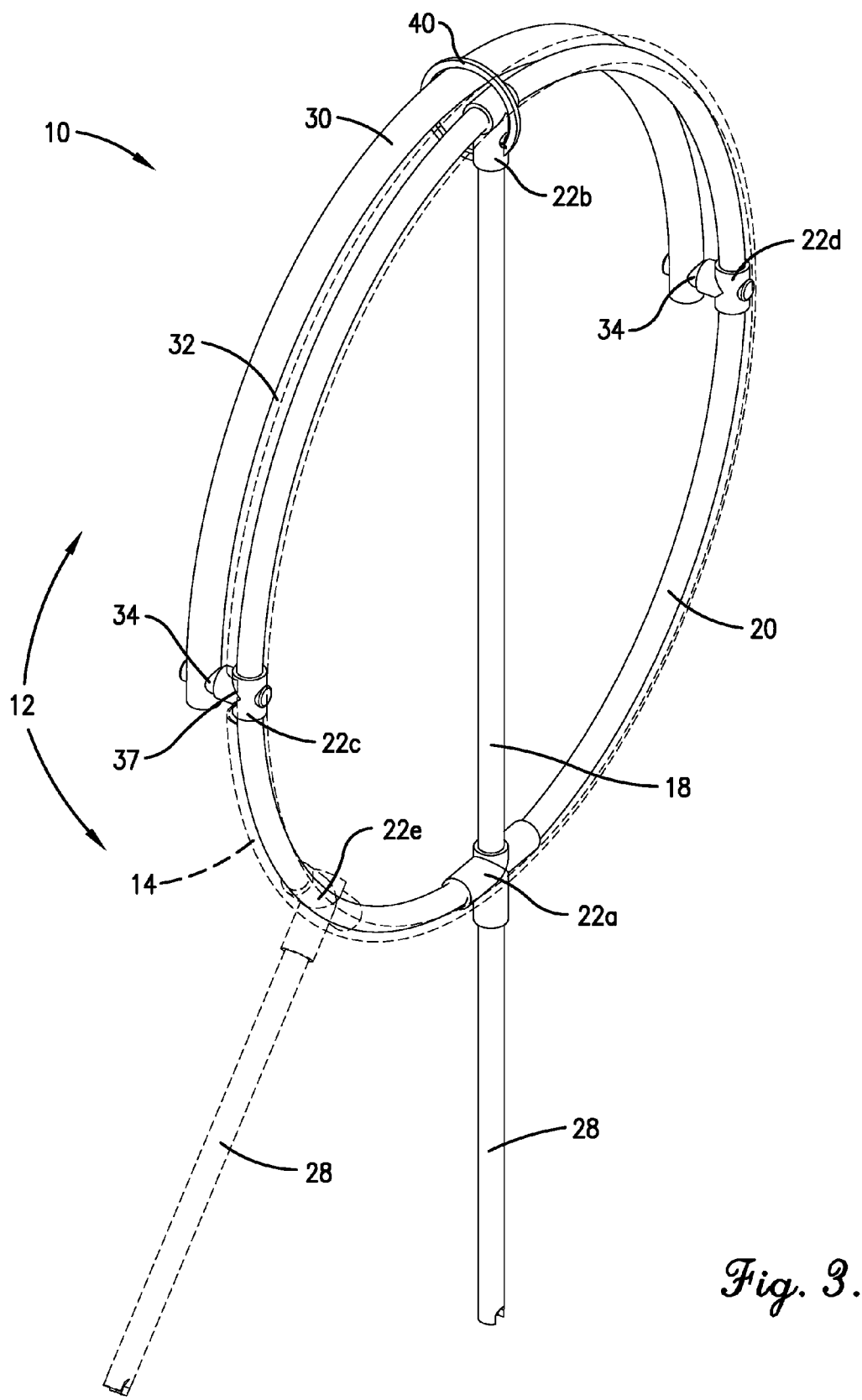
FIG. 3 is a front perspective view of the collapsible decoy illustrated in FIGS. 1 and 2, particularly illustrating the collapsible support structure and showing the sleeve in phantom.
Figure 4:
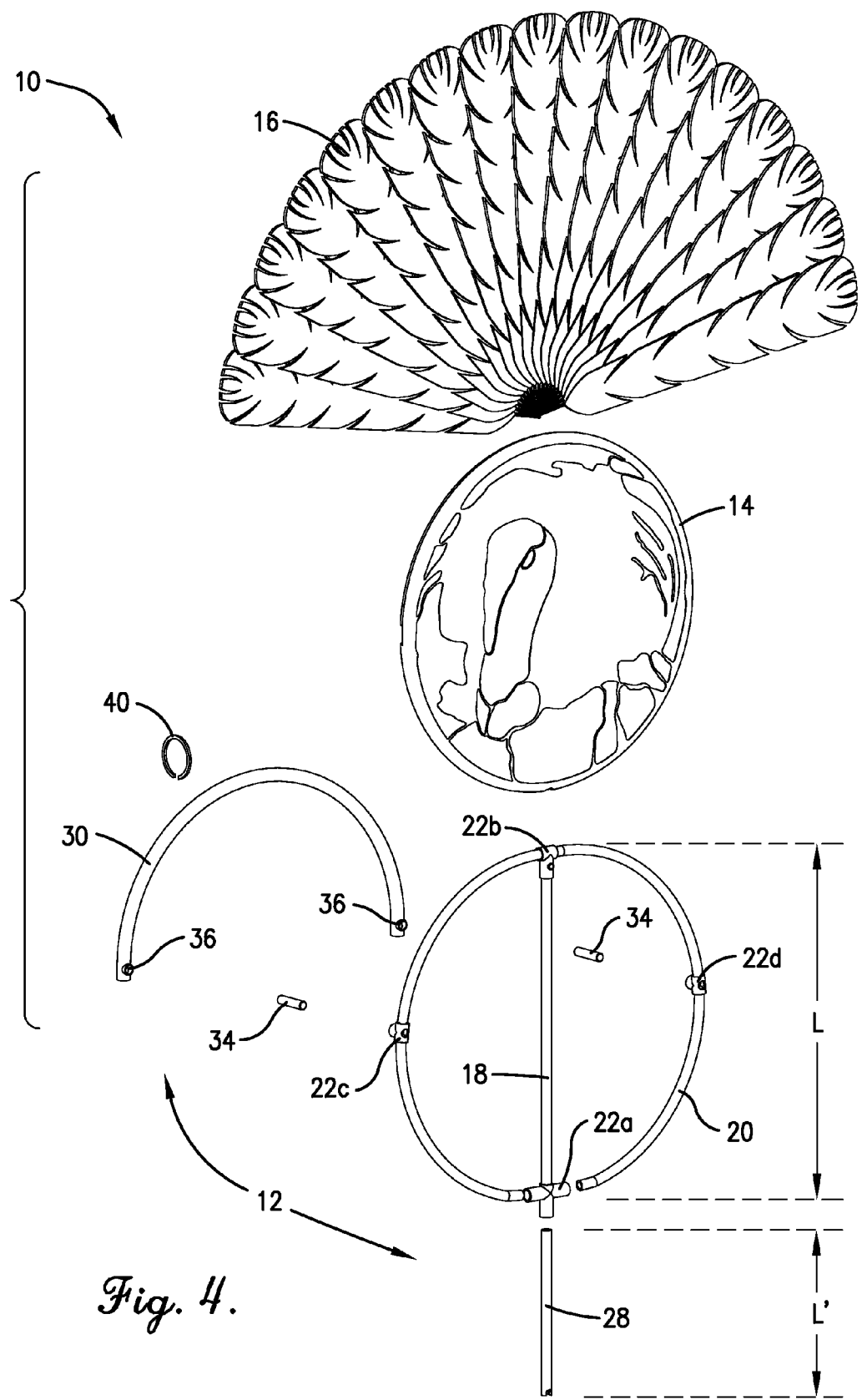
FIG. 4 is an exploded perspective view of the collapsible decoy shown in FIGS. 1-3.

FIGS. 1-4 illustrate a collapsible hunting decoy 10 configured according to one or more embodiments of the present invention. Decoy 10 comprises a collapsible support structure 12, which can be at least partially covered by a sleeve 14 having the likeness of at least a portion of an animal (e.g., a turkey) imprinted thereon. Decoy 10 can further comprise an attachable decoy element 16, which can be removably coupled to decoy 10 and may include or depict a further likeness of the animal, such as, for example, a turkey fan, as illustrated in FIGS. 1, 2, and 4. In addition, decoy 10 can be configured to engage a variety of base or mounting attachments (not shown in FIGS. 1-4) for holding or securing decoy 10 during its use. Although described herein with reference to a turkey, it should be understood that decoy 10 can be adapted for use with other types of game, especially birds or other small animals.

Collapsible support structure 12 of decoy 10 is illustrated as comprising an elongated, vertical-support member 18 coupled to an interior frame portion 20 via a plurality of fittings 22. Vertical-support member 18 can comprise an elongated rod or tube of any suitable, substantially uniform cross-sectional shape or size. In some embodiments, vertical-support member 18 may be hollow, while, in other embodiments, it may be solid throughout at least a portion, or all, of its length and/or cross-section. In one embodiment, the overall length of vertical-support member, measured between opposing ends thereof, can be at least about 6 inches, at least about 12 inches, at least about 18 inches and/or not more than about 5 feet, not more than about 4 feet, or not more than about 3 feet. Typically, the maximum cross-sectional dimension of vertical-support member 18 is not more than about 2 inches, not more than about 1.5 inches, not more than about 1 inch, or not more than about 0.5 inches.

Interior frame portion 20 of collapsible support structure 12 can also comprise an elongated tube or rod having a substantially uniform cross-sectional shape and size. In one embodiment, interior frame portion 20 can be a semi-rigid support element bent or otherwise formed to present a rounded (i.e., circular or elliptical) profile. As used herein, the term "semi-rigid" refers to an element comprising one or more resilient materials that are capable of flexure without permanently creasing or otherwise substantially changing the physical properties of the material. Examples of suitable resilient materials can include, but are not limited to, plastics, thermoplastics, metals, and the like. The overall length of interior frame portion 20 prior to being configured in a loop can be at least about 4 feet, at least about 5 feet, at least about 6 feet, or at least about 8 feet and/or not more than about 15 feet, not more than about 12 feet, or not more than about 10 feet. Once interior frame portion 20 has been shaped to provide a rounded profile, the maximum dimension (or diameter) of the resulting loop can be at least about 1 foot, at least about 2 feet, or at least about 3 feet and/or not more than about 5 feet, not more than about 4 feet, or not more than about 3.5 feet.

Interior frame portion 20 can be coupled to vertical member 18 at or adjacent to at least one of the upper and lower end thereof via a plurality of fittings 22. As used herein, the term "plurality" means one or more. Fittings can be coupled to least one of vertical-support member 18 and interior frame portion 20 in a permanent, semi-permanent, or temporary manner. For example, one or more of fittings 22 can be permanently or semi-permanently attached to vertical-support member 18 and/or interior frame portion 20 via welding, soldering, gluing, or another similar attachment mechanism. Alternatively, or in addition, one or more fittings 22 can be temporarily secured to vertical-support member 18 and/or interior frame portion 20 by being be slid onto, threaded onto, or otherwise temporarily coupled thereto. Fittings 22 can have any desirable configuration and can include at least 2, at least 3, or at least 4 openings configured to receive one or more elements of collapsible support structure 12. Notches, interior threads, tension, and/or compression may hold vertical-support member 18 and/or interior frame portion 20 to or within fittings 22. Although illustrated in FIGS. 3 and 4 as including four fittings 22a-d, collapsible support structure 12 can utilize any suitable number of fittings coupled to vertical-support member 18 and/or interior frame portion 20. Further, in some embodiments, one or more of fittings 22a-d can be coupled to vertical-support member 18 and/or interior frame portion 20 in one manner (e.g., permanently or semi-permanently), while one or more other fittings 22a-d can be coupled to vertical-support member 18 and/or interior frame portion 20 in another manner (e.g., slidably or removably coupled).

Once formed into a loop via one or more fittings 22, interior frame portion 20 can be coupled to vertical-support member 18 at, adjacent, or near at least one of the upper and lower ends of vertical-support member 18. In one embodiment, interior frame portion can be coupled near the upper end of vertical-support member 18. In this embodiment, the length of vertical-support member can be such that when interior frame portion 20 is secured adjacent the upper end of vertical-support member 18, the lower portion of vertical-support member 18 protrudes beyond the circumference of interior frame portion 20, thereby creating a handle portion 26 of vertical-support member 18, as shown in FIGS. 1 and 2.

In another embodiment, interior frame portion 20 can be coupled adjacent to both upper and lower ends of vertical-support member 18. In this embodiment, the length of vertical-support member 18 can be such that, when interior frame portion 20 is secured thereto, substantially none of length of vertical-support member 18 protrudes beyond the circumference of interior frame portion. In this embodiment, a separate handle attachment 28 may be utilized to allow the hunter to hold decoy 10 or mount decoy 10 into one or more various base elements, embodiments of which will be discussed in detail shortly. Handle attachment 28 can be attached to vertical-support member 18 and/or interior frame portion 20 via a frame fitting 22a (as shown in FIG. 3) or via a separate slidable fitting 22e (as shown in dashed lines in FIG. 3). Handle attachment 28, which can also be made of an elongated tube or rod, can have an overall length of at least 4 inches, at least 6 inches, at least 12 inches and/or not more than about 28 inches, not more than about 24 inches, or not more than about 20 inches, measured from end to end.

As shown in FIGS. 1-4, decoy 10 can further comprise a sleeve 14 sized and shaped to at least partially fit over interior frame 20. Sleeve 14 can be constructed of any suitable material, such as, for example fabrics such as cotton, polyester, and combinations thereof, and can include one or more fastening devices (not shown in FIGS. 1-4), such as buttons, zippers, hook-and-loop fasteners (e.g., VELCRO), snaps, and the like, for securing sleeve 14 in place once it has been fit over interior frame portion 20. In some embodiments, sleeve 14 may be sewn in place, such that it is not removable from interior frame portion 20 during normal assembly or disassembly of decoy 10.

As shown in FIGS. 1-4, at least a portion of sleeve 14 can include the likeness of some part of an animal imprinted thereon. In one embodiment, the animal likeness can be a two-dimensional image of at least a portion of the animal. As used herein, the term "two-dimensional" refers to an image or item having at least 99 percent of its total surface area defined within a single plane. In some embodiments, the images imprinted on sleeve 14 can be planar, such that the entirety of the image lies within a single plane. One or more sides of sleeve 14 can include a likeness and, when more than one side of sleeve 14 is imprinted, the likenesses used can be the same or different. Any suitable animal likeness can be used. In one embodiment shown in FIGS. 1-4, sleeve 14 can be imprinted with an image of the head and at least a portion of the body of a turkey. In one embodiment, the turkey can be a tom or male turkey.

In one embodiment, decoy 10 can further comprise an attachable decoy element 16 operable to be selectively coupled to decoy 10. Attachable decoy element 16 can be fastened to decoy 10 in any suitable manner and, in one embodiment, may be at least partially affixed to sleeve 14 and/or at least a portion of collapsible support structure 12 via an exterior frame portion 30. Exterior frame portion 30 is positioned outside of the interior of sleeve 14 and can be coupled to interior frame portion 20 to thereby form a receiving slot 32 into which attachable decoy element 16 can be inserted, thereby securing and at least partially housing attachable decoy element 16. In one embodiment shown in FIGS. 1-4, attachable decoy element 16 can be a turkey fan. The fan can be configured in any desired configuration, including, for example, a full strut and can be made of real feathers, synthetic feathers, or both real and synthetic feathers. Preferably, the fan is pre-assembled as a single attachable decoy element 16, as shown in FIG. 4, but, in some embodiments, an comprise single feathers to be individually inserted into and assembled into a fan within receiving slot 32.

Exterior frame portion 30 can be secured to interior frame portion 20 via a plurality of fastening posts 34 designed to extend between exterior frame portion 30 and interior frame portion 20. At least one of interior frame portion 20 and exterior frame portion 30 can define a plurality of apertures 36 sized and shaped to receive one of fastening posts 34 therethrough. Sleeve 14 can include a plurality of portals, each sized and shaped to permit one of fastening posts 34 to extend from within the interior of sleeve 14 to the exterior of sleeve 14, as illustrated in FIGS. 2 and 4. When fastening posts 34 are utilized to couple interior and exterior frame portions 20, 30 to one another, at least a portion, or substantially all, of receiving slot 32 can be at least partially defined between two of fastening posts 34, such that, when housed within receiving slot 32, attachable decoy element 16 abuts at least one of fastening posts 34, as particularly shown in FIG. 2. In one embodiment, at least one end of fastening posts 34 can be removably coupled to one of interior frame portion 20 and exterior frame portion 30, such that one or more fastening posts 34 can be removed during assembly or disassembly of collapsible support structure 12 and/or decoy 10. When removably coupled, in one embodiment, at least one end of fastening posts 34 can be configured to engage, couple, mate, or otherwise fasten to one or more fittings, shown as fittings 22c,d in FIGS. 3 and 4.

When assembled, decoy 10 can have an overall length (or longest dimension, designated as "L" in FIG. 4) of at least about 1.5 feet, at least about 2 feet, at least about 2.5 feet and/or not more than about 5 feet, not more than about 4 feet, or not more than about 3 feet, excluding both attachable decoy element 16 and handle portion 26 (or handle attachment 28, as applicable). When attached, decoy element 16 and handle portion 26 (or handle attachment 28, as applicable) may each provide an additional length, L', of at least about 6 inches, at least about 12 inches, or at least about 18 inches and/or not more than about 36 inches, not more than about 30 inches, or not more than about 24 inches. The width, or second longest dimension, of decoy 10, illustrated as "W" in FIG. 1, can be at least about 10 percent, at least about 25 percent, at least about 40 percent and/or not more than about 60 percent, not more than about 50 percent, or not more than about 45 percent of the total overall length, L+L', of decoy 10. In some embodiments, the width of decoy 10 can be at least about 1 foot, at least about 1.5 feet, at least about 2 feet and/or not more than about 3 feet, not more than about 2.5 feet, or not more than about 2 feet. The thickness, or shortest dimension, of decoy 10, when fully assembled, can be not more than about 10 percent, not more than about 5 percent, or not more than about 1 percent of the total overall length, L+L', of decoy assembly 10. In some embodiments, the thickness of decoy 10, shown as "D" in FIG. 2, can be at least about 4 inches, at least about 6 inches, at least about 12 inches and/or not more than about 18 inches, not more than about 12 inches, or not more than about 10 inches.

In one embodiment of the present invention, decoy 10 can be configured to utilize a number of different base elements or mounting attachments, each sized and shaped to be coupled to a lower end of handle portion 26 and/or handle attachment 28, as applicable. Compatibility with several types of base elements allows decoy 10 to be employed in a variety of hunting scenarios. For example, in one embodiment, decoy 10 can be coupled to at least one base member selected from the group consisting of a stake, a clamp, and a bow mount, thereby allowing decoy 10 to be inserted into the ground, clamped onto a solid object, or mounted to a hunter's bow. Additional details regarding specific embodiments of base elements attachable to handle portion 26 or handle attachment 28 will now be discussed in detail below, with reference to FIGS. 5-8.

Figures 5A, 5B:
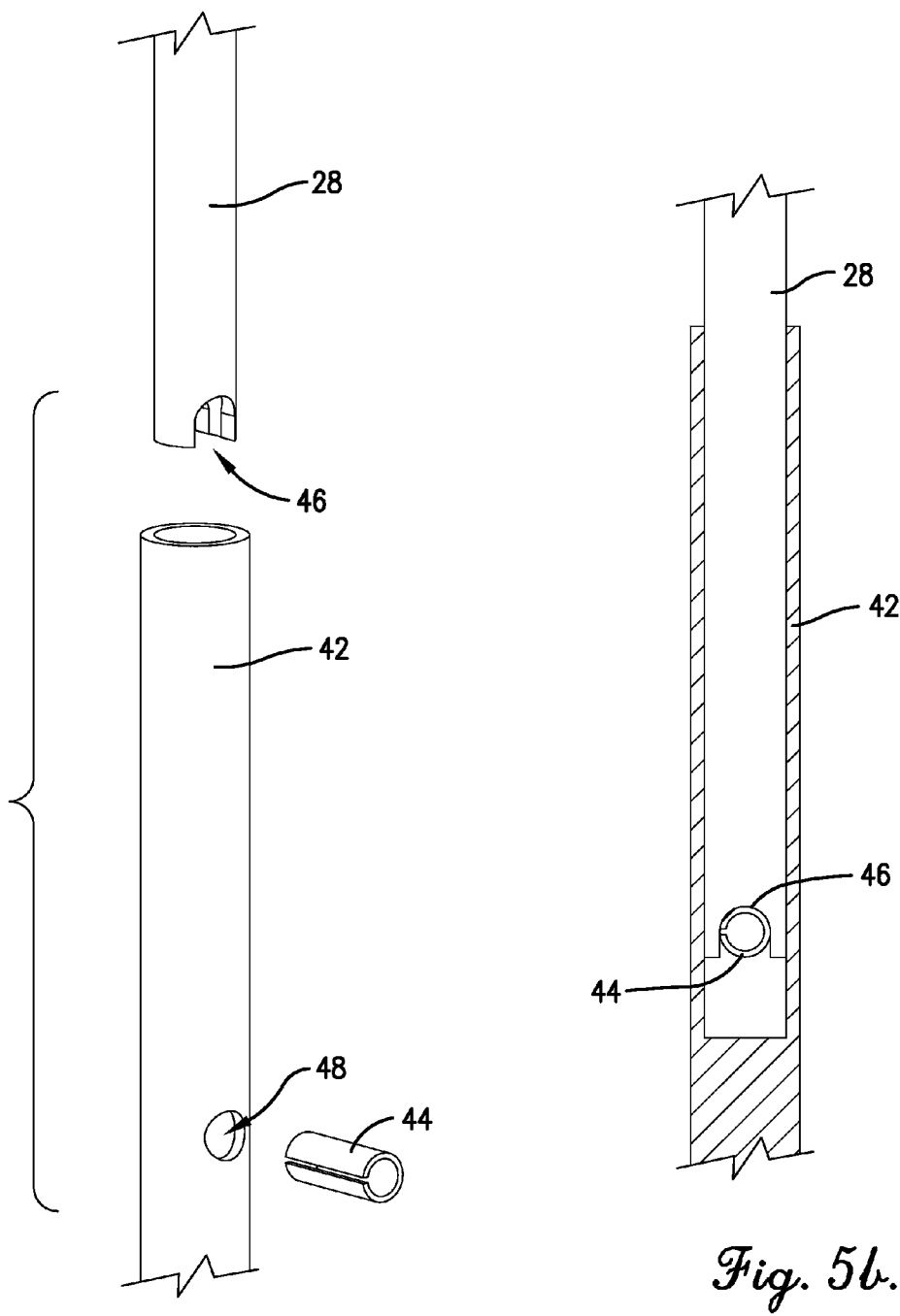
FIG. 5a is fragmentary perspective view of the main components of an attachment mechanism used to secure the decoy to a base element.
FIG. 5b is a fragmentary section view of the attachment mechanism shown in FIG. 5a, particularly illustrating a handle attachment secured within an elongated portion of the base element.

Turning initially to FIGS. 5a and 5b, one embodiment of an attachment mechanism for coupling the lower end of handle 28 (or handle portion 26, not shown) to an elongated portion 42 of a base element (not shown) is provided. In one embodiment, one of the lower end of handle attachment 28 and elongated portion 42 of the base element can include a male connecting element 44, such as, for example, a peg, pin, or tube, while the other of handle attachment 28 and elongated portion 42 of the base element can include a corresponding female connecting element 46, such as a notch, slot, or hole, for engaging, mating, or otherwise attaching male connector 44 thereto.

At least one of handle attachment 28 and elongated portion 42 of the base element can have a smaller diameter than the other, thereby allowing a portion of the smaller-diameter element to slide into (and be at least partially encompassed by) the other. In one embodiment depicted in FIGS. 5a and 5b, the lower end of handle attachment 28 comprises a notch 46 and the base element includes a pin 44 insertable into a hole 48 of elongated portion 42 of the base element. Although illustrated in FIG. 5a as being a free-standing pin, in another embodiment, pin 44 can be at least partially integrally coupled with elongated portion 42. When handle attachment 28 is inserted into and at least partially encompassed by elongated portion 42 of the base element, notch 46 engages with detachable pin 44, thereby securing handle attachment 28 into the base element, as shown in FIG. 5b. As a result of the above-described attachment mechanism, the rotation of handle attachment 28 (or, when applicable, handle portion 26) relative to the base element can be reduced, minimized or prevented, which stabilizes decoy 10 in breezy hunting situations.

Turning now to FIGS. 6a and 6b, two embodiments of ground stake base elements 50a,b are provided. When the base element comprises ground stake 50, the attachment mechanism between elongated portion 52 of stake 50 and the lower end of handle portion 26 (or handle attachment 28, as applicable) can be similar to the mechanism discussed previously. FIG. 6b illustrates an attachment mechanism that includes a pin 54b similar to the mechanism discussed with respect to FIGS. 5a and 5b, while the attachment mechanism illustrated in FIG. 6a includes a tube 54a of elongated portion 52 of stake 50a that slides into and is secured by a notch or slot 56 of handle attachment 28. Ground stake 50 can have a variety of configurations, including, for example, a straight stake 50a as illustrated in FIG. 6a or a T-shaped stake 50b as shown in FIG. 6b. Ground stake 50 can be constructed of any suitable material, such as metal, plastic, or the like, and and may have an overall length of at least about 6 inches, at least about 10 inches, or at least about 12 inches and/or not more than about 24 inches, not more than about 18 inches, or not more than about 12 inches.

Figure 7:
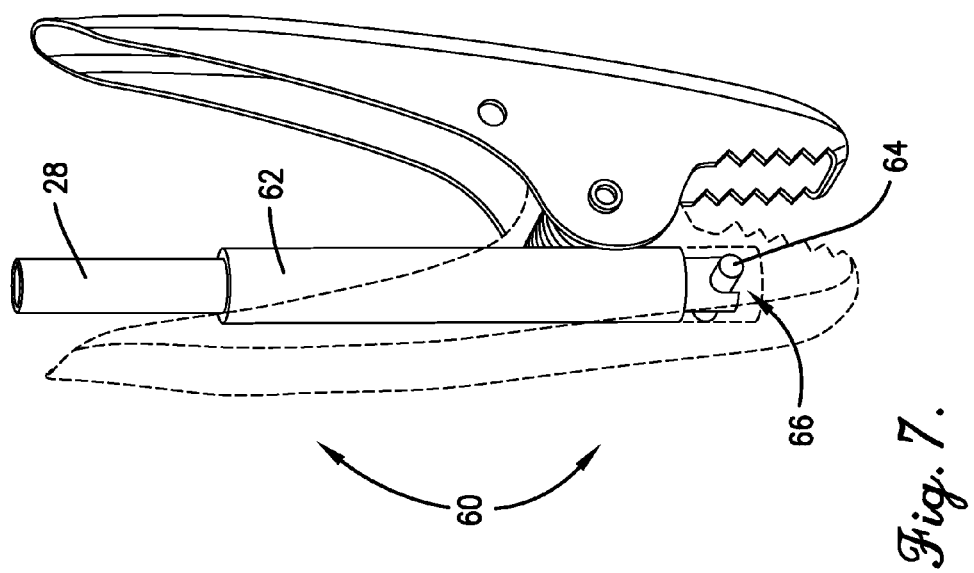
FIG. 7 is a fragmentary perspective view of a clamp base element suitable for attachment to the collapsible structure of the decoy.

Turning now to FIG. 7, one embodiment of a clamp base element 60 is provided that is operable to be attached to a lower end of handle attachment 28 (or handle portion 26, as applicable) in a similar manner described previously with respect to FIGS. 5a and 5b. Specifically, as depicted in FIG. 7, clamp 60 comprises an elongated portion 62 sized and shaped to receive the lower end of handle portion attachment 28 therein. Once inserted, a notch 66 of the lower end of handle attachment 28 can be mated, engaged, or otherwise fastened via a clamp attachment pin 64 thereby coupling clamp 60 to handle attachment 28. Clamp 60 can be any type of spring tension clamp that permits decoy 10 to be mounted to any suitable solid, free-standing object, such as a rail, a branch, or the like, during use.

Figure 8:
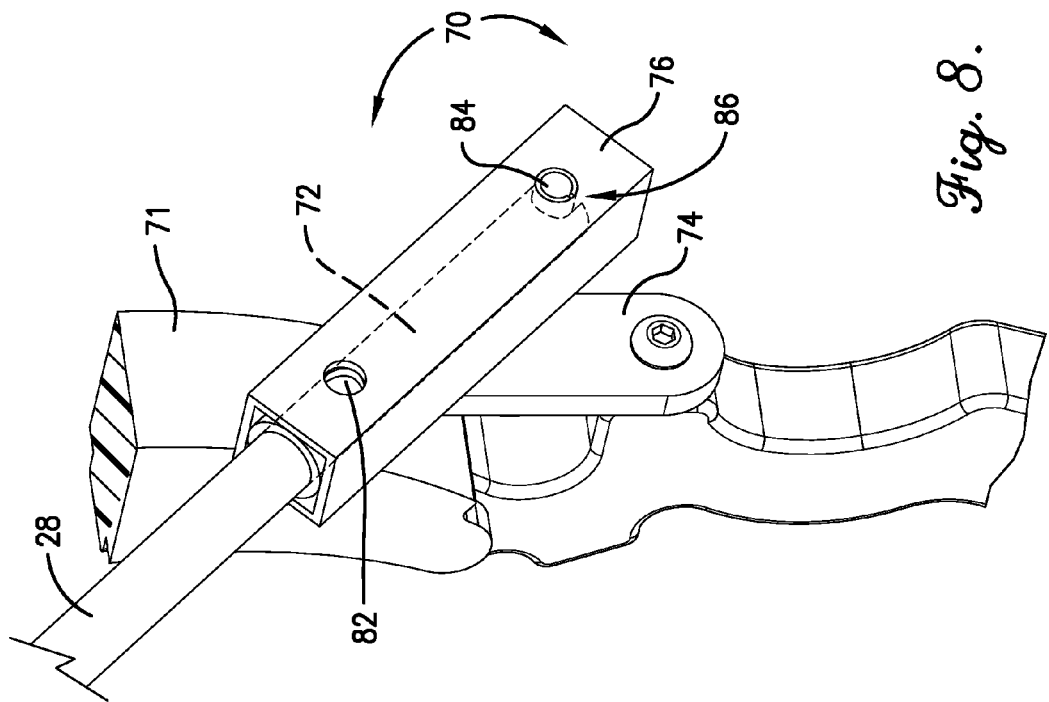
FIG. 8 is a fragmentary perspective view of a bow mount base element suitable for attachment to the collapsible structure of the decoy.

Referring now to FIG. 8, a bow mount 70 configured according to one embodiment of the present invention is provided. Bow mount 70 can be operable to couple decoy 10 to a hunter's bow (a portion 71 of an exemplary bow is provided in FIG. 8) so that the hunter does not need to hold the decoy while using the bow to hunt. Depending on the specific mounting configuration on the bow, at least a portion of decoy 10 can also optionally be used as concealment for the hunter. In the embodiment depicted in FIG. 8, bow mount 70 comprises a flat portion 74 coupled to a hollow portion 76 via one or more securing bolts (not shown). Hollow portion 76 can have any suitable cross-sectional shape, including, for example, a square cross-sectional shape as shown in FIG. 8. Similarly to clamp 60, bow mount 70 can include an elongated portion 72 positioned within hollow portion 76, which is sized and shaped to receive the lower end of handle attachment 28 (or handle portion 26, as applicable) therein. Hollow portion 76 and elongated portion 72 of bow mount 70 define at least one set of concentric holes (an unused set 82a is shown in FIG. 8) for receiving a stabilizing pin 84, to which a notch (not shown) in handle attachment 28 can be coupled, mated, or engaged in a similar manner as described previously with respect to FIGS. 5a and 5b. In one embodiment, bow mount 70 can be rotatably coupled to the bow, thereby further enhancing the flexibility and applicability of decoy 10.

Figure 9:
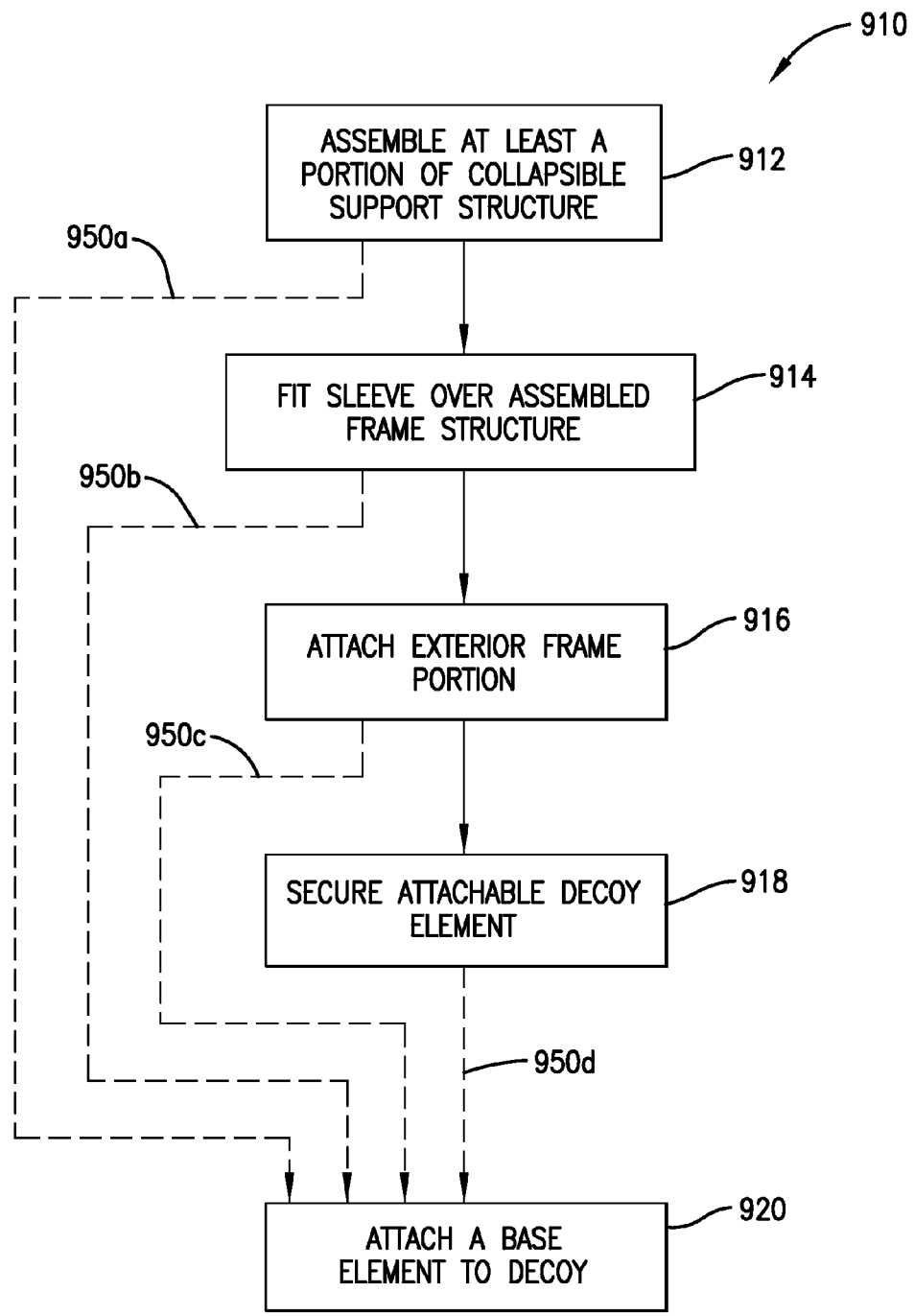
FIG. 9 is a flow chart depicting the major steps of assembling a collapsible decoy element according to one embodiment of the present invention.
Figure 10B:
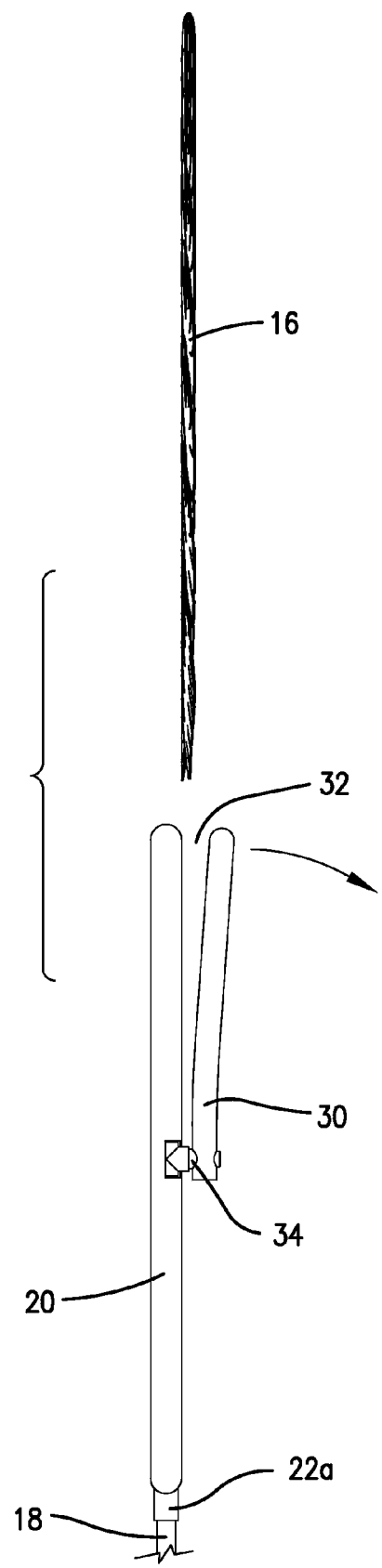
FIG. 10b is a partially exploded side elevational view of the collapsible support structure and attachable decoy element, particularly illustrating the insertion of the decoy element into a receiving slot within the decoy.

FIG. 9 provides a flow chart outlining the major steps of a method 910 of assembling a collapsible decoy according to one or more embodiments of the present invention. The first step of method 910 is assembling at least a portion of collapsible support structure 12, as indicated by block 912. In one embodiment, this can include coupling interior frame portion 20 to vertical-support member 18 via one or more fittings 22, as mentioned previously. When interior frame portion is a semi-rigid support member, this step of coupling can include bending or otherwise flexing interior frame portion 20 from a substantially elongated position, as shown in FIG. 10a, to a rounded profile, indicated by dashed lines 21 in FIG. 10a. Thereafter, each end of interior frame portion 20 can be inserted into respective first and second openings of a first fitting 22a. Subsequently, vertical-support member 18 can then be inserted into a third opening of the same fitting 22a, thereby coupling internal frame portion 20 to vertical-support member 18. Optionally, vertical-support memer 18 can be inserted all the way through fitting 22a and into an opening of another fitting 22b positioned at different location along internal frame portion 20. In this embodiment, a second point of contact is provided between interior frame portion 20 and vertical-support member 18, thereby enhancing the overall stability of decoy 10.

Once this portion of collapsible support structure 12 is assembled, sleeve 14 can be fitted over at least a portion of interior frame portion 20, as indicated generally by block 914 in FIG. 9. As discussed previously, sleeve can be sized and shaped to be slid over interior frame portion 20 and may include one or more securing devices (such as snaps or a zipper) for closing sleeve 14, once fitted. Alternatively, if decoy 10 will not be fully disassembled during its normal use, sleeve 14 may be sewn or otherwise semi-permanently closed over interior frame portion 20.

Thereafter, exterior frame portion 30 can be attached to interior frame portion 20, as indicated by block 916 of FIG. 9. Exterior and interior frame portions can be permanently, semi-permanently, or temporarily fastenened together, using one or more mechanisms described in detail previously. Subsequently, as indicated by block 918, attachable decoy element 16, such as a turkey fan, can then be inserted into receiving slot 32 formed between exterior and interior frame portions 20, 30. In one embodiment, this can be accomplished by moving at least one of exterior and interior frame portions 30, 20 to thereby widen slot 32, inserting attachable decoy element 16 into the widened slot, and allowing the moved frame portion to return to its original position, thereby securing attachable decoy portion within receiving slot 32. Thereafter, a retaining clip 40, as shown in FIGS. 3 and 4, or other device may be used to further secure interior and exterior frame portions 20, 30 to one another, further securing attachable decoy element 16. In one embodiment, retaining clip 40 can be freely and easily decoupled from collapsible support structure.

As shown in FIG. 9, method 910 includes the step of attaching a base element to the lower end of handle portion 26 (or handle attachment 28, as applicable), as represented by block 920. This step can be carried out an nearly any time during the execution of method 910. For example, as respectively indicated by dashed lines 950a-d, a suitable base element can be attached to vertical-support member 18 after assembling the collapsible support structure (represented by line 950a), after fitting sleeve 14 onto interior frame portion 20 (represented by line 950b), after attaching the exterior frame portion (represented by line 950c), or after securing attachable decoy element 16 (represented by line 950d). To disassemble all, or a portion, of decoy 10, one or more steps of the above-discussed flow chart can be carried out in reverse order. In one embodiment, decoy 10 remains substantially assembled during its normal use, while, in other embodiments, a portion, or all, of decoy 10 may be disassembled and/or reassembled multiple times, as needed.

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention. The inventor hereby state his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A collapsible decoy assembly comprising:
   an elongated vertical-support member having an upper end and a lower end;
   a plurality of fittings coupled to said vertical-support member;
   an interior frame portion coupled to at least one of said plurality of fittings to thereby form a continuous loop adjacent at least one of said upper and said lower end of said vertical-support member;
   a sleeve sized and shaped to fit over said interior frame portion, wherein said sleeve has a likeness of a first portion of an animal imprinted thereon;
   an exterior frame portion positioned on the outside of said sleeve and coupled to said interior frame portion to thereby define a receiving slot therebetween; and
   a plurality of fastening posts extending between said exterior frame portion and said interior frame portion.

2. The decoy assembly according to claim 1, wherein said likeness comprises an image of the head and at least a portion of the body of a turkey.

3. The decoy assembly according to claim 1, further comprising:
   an attachable decoy element having a likeness of a second portion of said animal, wherein said attachable decoy element is sized and shaped to be inserted into and at least partially housed in said receiving slot.

4. The decoy assembly according to claim 3, further comprising:
   a plurality of apertures defined in at least one of said exterior frame portion and said interior frame portion, wherein each aperture is sized and shaped to receive one of said plurality of fastening posts therethrough,
   wherein said receiving slot is at least partially defined between two of said plurality of said fastening posts, wherein said attachable decoy element, when housed within said receiving slot, abuts at least one of said plurality of fastening posts.

5. The decoy assembly according to claim 3, wherein said first and second portions of said animal include a head of a turkey, at least a partial body of said turkey, and a fan of said turkey.

6. The decoy assembly according to claim 1, further comprising:
   an optional handle attachment having a first end and a second end, wherein said first end of said handle attachment, when present, is coupled to at least one of said interior frame portion and said vertical-support member via one of said plurality of fittings; and
   a base element sized and shaped to slidably engage said lower end of said vertical-support member or, when present, said second end of said handle attachment, wherein said base element is selected from the group consisting of a stake, a mount, and a clamp.

7. The decoy assembly according to claim 6, wherein said vertical-support member or, when present, said handle attachment and said base element are coupled to one another such that rotation of said vertical-support member or said handle attachment relative to said base element is minimized.

8. The decoy assembly according to claim 1, wherein said decoy assembly has a length of not more than 5 feet and a thickness of not more than 18 inches.

9. A collapsible decoy assembly comprising:
   an elongated support member having an first end and a second end;
   a semi-rigid interior frame portion;
   a plurality of fittings for coupling said interior frame portion to said elongated support member such that said interior frame portion forms a continuous loop adjacent at least one of said first and said second ends of said elongated support member;
   a sleeve sized and shaped to at least partially cover said interior frame portion, wherein said sleeve comprises a two-dimensional likeness of a first portion of an animal imprinted thereon;
   an exterior frame portion positioned outside of said sleeve and coupled to said interior frame portion to thereby define a receiving slot therebetween;
   an attachable decoy element sized and shaped to be inserted into and at least partially housed within said receiving slot, wherein said attachable decoy element comprises a likeness of a second portion of said animal; and
   a plurality of fastening posts extending between said exterior frame portion and said interior frame portion.

10. The decoy assembly according to claim 9, wherein said first and second portions of said animal include a head of a turkey, at least a partial body of said turkey, and a fan of said turkey, wherein said fan is a real fan, a synthetic fan, or a combination thereof.

11. The decoy assembly according to claim 9, further comprising:
    a plurality of apertures defined in at least one of said exterior frame portion and said interior frame portion that are each sized and shaped to receive one of said fastening posts therethrough,
    wherein said receiving slot is at least partially defined between at least two of said plurality of fastening posts and wherein at least a portion of said plurality of fastening posts are removably coupled to at least one of said exterior frame portion and said interior frame portion.

12. The decoy assembly according to claim 9, further comprising:
    an optional handle attachment having a first end and a second end, wherein said first end of said handle attachment, when present, is coupled to at least one of said interior frame portion and said elongated support member via one of said plurality of fittings; and
    a base element sized and shaped to slidably engage said lower end of said elongated support member or, when present, said second end of said handle attachment,
    wherein said base element is selected from the group consisting of a stake, a mount, and a clamp.

13. The decoy assembly according to claim 12, wherein said base element and said vertical-support member or, when present, said handle attachment are coupled to one another such that rotation of said elongated support member or said handle attachment relative to said base element is minimized.

14. The decoy assembly according to claim 9, wherein said decoy has a length of not more than 5 feet and a thickness of not more than 18 inches.

15. A method of assembling a collapsible decoy, said method comprising:
    (a) coupling a semi-rigid interior frame support member having a first end and a second end to an elongated support member using at least one pair of fittings to thereby form an interior frame portion configured in a loop adjacent at least one end of said elongated support member;

(b) fitting a sleeve having a likeness of a first portion of an animal imprinted thereon over said interior frame portion.
(c) coupling opposing ends of an exterior frame portion to said interior frame portion to thereby create a receiving slot therebetween;
(d) at least partially widening said receiving slot by moving at least one of said interior frame portion and said exterior frame portion;
(e) inserting an attachable decoy element into the widened receiving slot; and
(f) narrowing said receiving slot with said attachable decoy element at least partially disposed therein,
wherein said attachable decoy element comprises a likeness of a second portion of said animal.

16. The method according to claim 15, wherein said likeness of said first portion of said animal is a two-dimensional image of the head and at least a partial body of a turkey, wherein said likeness of a second portion of said animal is a fan of said turkey, wherein said fan is a real fan, a synthetic fan, or a combination thereof.

17. The method according to claim 16, wherein said exterior frame portion is at least partially coupled to said interior frame portion via a plurality of fastening posts that project from one of said exterior frame portion and said interior frame portion, through said sleeve, and into the other of said exterior frame portion and said interior frame portion, wherein said fastening posts are inserted into one or more apertures defined by at least one of said interior and said exterior frame portions, wherein said receiving slot is at least partially defined by at least two of said fastening posts and said attachable decoy element, when inserted into and at least partially housed within said receiving slot, abuts at least one of said plurality of fastening posts.

18. The method according to claim 15, wherein said coupling of step (a) includes inserting said first and said second ends of said interior frame support member into opposite ends of one fitting of said at least one pair of fittings, wherein said coupling of step (a) also comprises passing said elongated support member at least partially through said one fitting of said at least one pair of fittings before inserting an upper end of said elongated support member into another fitting of said at least one pair of fittings.

19. The method according to claim 15, further comprising optionally connecting a handle attachment to said interior frame portion and/or said elongated support member via one or more fittings and connecting a base element to at least one of said elongated support member and said handle attachment, wherein said base element is selected from the group consisting of a stake, a clamp, and a mount.

* * * * *